United States Patent
Pignataro et al.

(10) Patent No.: US 11,088,928 B2
(45) Date of Patent: Aug. 10, 2021

(54) SERVICE AWARE CONDITIONAL PATH MONITORING

(71) Applicant: Cisco Technology, Inc., San Jose, CA (US)

(72) Inventors: Carlos M. Pignataro, Cary, NC (US); Benoit Claise, Othée (BE); Nagendra Kumar Nainar, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/601,969

(22) Filed: Oct. 15, 2019

(65) Prior Publication Data

US 2021/0111971 A1     Apr. 15, 2021

(51) Int. Cl.
*H04L 12/26*     (2006.01)
*H04L 12/721*    (2013.01)
*H04L 12/707*    (2013.01)

(52) U.S. Cl.
CPC ............. *H04L 43/04* (2013.01); *H04L 43/50* (2013.01); *H04L 45/14* (2013.01); *H04L 45/24* (2013.01)

(58) Field of Classification Search
None
See application file for complete search history.

(56) References Cited

U.S. PATENT DOCUMENTS

| 9,014,013 | B2 | 4/2015 | Durrani et al. |
| 9,059,941 | B1 | 6/2015 | Oweis et al. |
| 9,304,815 | B1 | 4/2016 | Vasanth et al. |
| 9,565,092 | B2 | 2/2017 | Vacera et al. |
| 9,660,929 | B1 | 5/2017 | Herzog |
| 9,774,541 | B1 | 9/2017 | Herzog et al. |
| 9,825,865 | B1 * | 11/2017 | Sharma ................. H04L 47/125 |

(Continued)

FOREIGN PATENT DOCUMENTS

| EP | 1206085 A1 | 5/2002 |
| EP | 3467644 A1 | 4/2019 |

(Continued)

OTHER PUBLICATIONS

Iqbal, Faisal et al., "Data Plane Monitoring in Segment Routing Networks", downloaded Sep. 30, 2019, 18 pages.

(Continued)

*Primary Examiner* — Phyllis A Book
(74) *Attorney, Agent, or Firm* — Edell, Shapiro & Finnan, LLC

(57) ABSTRACT

In one embodiment, a method is provided service aware conditional path monitoring. The method includes determining, for a network that includes a plurality of nodes, which particular nodes of the plurality of nodes forward traffic associated with a service. The method involves identifying relevant forwarding instructions within the particular nodes that are used to forward traffic for the service. The method further includes configuring the particular nodes to perform monitoring of traffic with a higher priority given to the relevant forwarding instructions than other forwarding instructions on the particular nodes. Monitoring results are obtained from the monitoring of traffic on the particular nodes on the relevant forwarding instructions. The monitoring results are analyzed to determine assurance of the service in the network.

20 Claims, 7 Drawing Sheets

(56) References Cited

U.S. PATENT DOCUMENTS

| | | | |
|---|---|---|---|
| 9,929,923 B2 | 3/2018 | Heinz et al. | |
| 9,992,082 B2 | 6/2018 | MacNeil et al. | |
| 10,158,556 B2 | 12/2018 | Iqbal et al. | |
| 10,277,461 B1 | 4/2019 | A et al. | |
| 10,372,520 B2 | 8/2019 | Johnston et al. | |
| 10,467,087 B2 | 11/2019 | Zarrini et al. | |
| 10,503,613 B1 | 12/2019 | Moses | |
| 10,630,539 B2 | 4/2020 | Tubillara et al. | |
| 10,637,744 B2 | 4/2020 | Carroll et al. | |
| 10,650,048 B2 | 5/2020 | Li et al. | |
| 10,778,754 B2 | 9/2020 | Capello et al. | |
| 2005/0181835 A1 | 8/2005 | Lau et al. | |
| 2009/0094078 A1 | 4/2009 | Kaehne | |
| 2011/0261049 A1 | 10/2011 | Cardno et al. | |
| 2012/0106322 A1* | 5/2012 | Gero | H04L 45/22 370/225 |
| 2012/0209948 A1 | 8/2012 | Tenenblat et al. | |
| 2012/0215912 A1 | 8/2012 | Houlihan et al. | |
| 2014/0219105 A1* | 8/2014 | Sathappan | H04L 12/4641 370/238 |
| 2015/0100371 A1 | 4/2015 | Leader | |
| 2015/0134788 A1 | 5/2015 | Kalyana et al. | |
| 2015/0143355 A1 | 5/2015 | Tingstrom et al. | |
| 2016/0026675 A1 | 1/2016 | Liu et al. | |
| 2016/0042014 A1* | 2/2016 | Jalan | G06F 16/21 707/610 |
| 2016/0043944 A1 | 2/2016 | Felstaine et al. | |
| 2016/0127201 A1 | 5/2016 | Qian et al. | |
| 2016/0142251 A1 | 5/2016 | Contreras et al. | |
| 2016/0182320 A1 | 6/2016 | Bartfai-Walcott et al. | |
| 2016/0359878 A1* | 12/2016 | Prasad | H04L 45/38 |
| 2017/0063599 A1 | 3/2017 | Wu et al. | |
| 2017/0078176 A1* | 3/2017 | Lakshmikantha | H04L 47/562 |
| 2017/0149637 A1* | 5/2017 | Banikazemi | H04L 41/5025 |
| 2017/0289060 A1 | 10/2017 | Aftab et al. | |
| 2017/0324768 A1 | 11/2017 | Crabtree et al. | |
| 2018/0152359 A1 | 5/2018 | Qian et al. | |
| 2018/0309632 A1 | 10/2018 | Kompella et al. | |
| 2019/0028909 A1 | 1/2019 | Mermoud et al. | |
| 2019/0081869 A1 | 3/2019 | Wu et al. | |
| 2019/0098071 A1* | 3/2019 | Bitincka | H04L 29/08072 |
| 2019/0104019 A1 | 4/2019 | Makovsky et al. | |
| 2019/0124555 A1* | 4/2019 | Szilagyi | H04W 28/0236 |
| 2019/0132213 A1 | 5/2019 | Na et al. | |
| 2019/0253328 A1 | 8/2019 | Kolar et al. | |
| 2019/0363979 A1* | 11/2019 | Cui | H04L 45/308 |
| 2019/0394283 A1 | 12/2019 | Morrison | |
| 2020/0042426 A1 | 2/2020 | Ambichl et al. | |
| 2020/0045116 A1 | 2/2020 | Deodhar et al. | |
| 2020/0050444 A1 | 2/2020 | Nikam et al. | |
| 2020/0133701 A1 | 4/2020 | Agrawal et al. | |
| 2020/0169494 A1* | 5/2020 | K | H04L 43/12 |

FOREIGN PATENT DOCUMENTS

| | | | |
|---|---|---|---|
| WO | WO-2016119620 A1 * | 8/2016 | H04L 29/06176 |
| WO | 2017129248 A1 | 8/2017 | |

OTHER PUBLICATIONS

R. Geib, Ed. et al., "A Scalable and Topology-Aware MPLS Data-Plane Monitoring System", Internet Engineering Task Force (IETF), Request for Comments: 8403, Jul. 2018, 19 pages.

R. Geib, Ed. et al., "A Scalable and Topology-Aware MPLS Dataplane Monitoring System", draft-ietf-spring-oam-usecase-09, Jul. 25, 2017, 13 pages.

Cisco, "Intent-Based Networking", C11-740210-00, Jan. 2018, 11 pages.

Path Solutions, "Root-Cause Troubleshooting for Your Entire Network", Path Solutions Inc., 2019, 2 pages.

VMWare, "Vmware Smart Assurance", VMWare, Inc., Palo Alto, CA, 2019, 4 pages.

International Search Report and Written Opinion in International Application No. PCT/US2020/052645, dated Dec. 11, 2020, 15 pages.

International Search Report and Written Opinion in International Application No. PCT/US2020/062137, dated Mar. 5, 2021, 14 pages.

\* cited by examiner

```
}headend: R1
    (services: SR-TE
        {Tunnel_ID: 100
            {
            EndPoint:R8
            Segments: {16002, 19023, 16007, 16008}
            Path1
                {R1, R2, R3, R5, R7, R8
                }
            Path2
                {R1, R2, R3, R6, R7, R8
                }
            }
        }
        {Tunnel_ID: 101
            {
            EndPoint:R8
            Segments: {16002, 16007, 16008}
            Path1
                {R1, R2, R3, R5, R7, R8
                }
            Path2
                {R1, R2, R3, R6, R7, R8
                }
            Path3
                {R1, R2, R4, R6, R7, R8
                }
            Path4
                {R1, R2, R4, R5, R7, R8
                }
            }
        }
        {Tunnel_ID: 102
            {
            EndPoint:R9
            Segments: {16002, 16009}
            Path1
                {R1, R2, R3, R5, R9
                }
            Path2
                {R1, R2, R4, R5, R9
                }
            }
        }
    }
}
```

SERVICE AWARE CONDITIONAL PATH MONITORING

TECHNICAL FIELD

The present disclosure relates to service assurance in a network.

BACKGROUND

Site-to-Site connectivity with a certain Service Level Agreement (SLA) is a business intent Layer 3 Virtual Private Network (L3VPN service) that can be decomposed into multiple level of sub-services to be monitored and measured for service assurance. An end-to-end Operations, Administration and Management (OAM) mechanism, such as Equal Cost Multi-Path (ECMP)-aware Seamless Bi-Directional Forwarding (SBFD) or Internet Protocol SLA (IPSLA) could be used for monitoring, such mechanisms are a challenge to deploy and operate for larger networks.

BRIEF DESCRIPTION OF THE DRAWINGS

FIG. 3 illustrates examples of decomposed service information for an example L3VPN service, according to an example embodiment.

DESCRIPTION OF EXAMPLE EMBODIMENTS

Overview

Techniques are presented herein for service aware conditional path monitoring. In one embodiment, a method is provided including determining, for a network that includes a plurality of nodes, which particular nodes of the plurality of nodes forward traffic associated with a service. The method involves identifying relevant forwarding instructions within the particular nodes that are used to forward traffic for the service. The method further includes configuring the particular nodes to perform monitoring of traffic with a higher priority given to the relevant forwarding instructions than other forwarding instructions on the particular nodes. Monitoring results are obtained from the monitoring of traffic on the particular nodes on the relevant forwarding instructions. The monitoring results are analyzed to determine assurance of the service in the network.

Example Embodiments

Service Assurance for Intent based Networking is a technology designed to provide assurance as a service for end customers of network services. In a nutshell, such a service assurance system leverages the programming capabilities of the network devices and a model/event driven telemetry to deliver end-to-end service assurance.

Data Plane Monitoring (DPM) or Self Label Switch Routing (LSR) test is a technique that loops the probe from upstream and terminates the same at downstream (using time to live values) and validate its own forwarding table. Current techniques involve validating all the prefixes/labels in the forwarding table, because a transit node may not have any visibility into the service for which the node is being used.

Presented herein are techniques that leverage the business intent visibility of a service assurance system, and path computation element (PCE) or network orchestrator capabilities to identify the forwarding information on relevant nodes to instantiate monitoring based on service awareness, prioritizing certain forwarding information and subscribing to the monitoring results.

Figure 1:
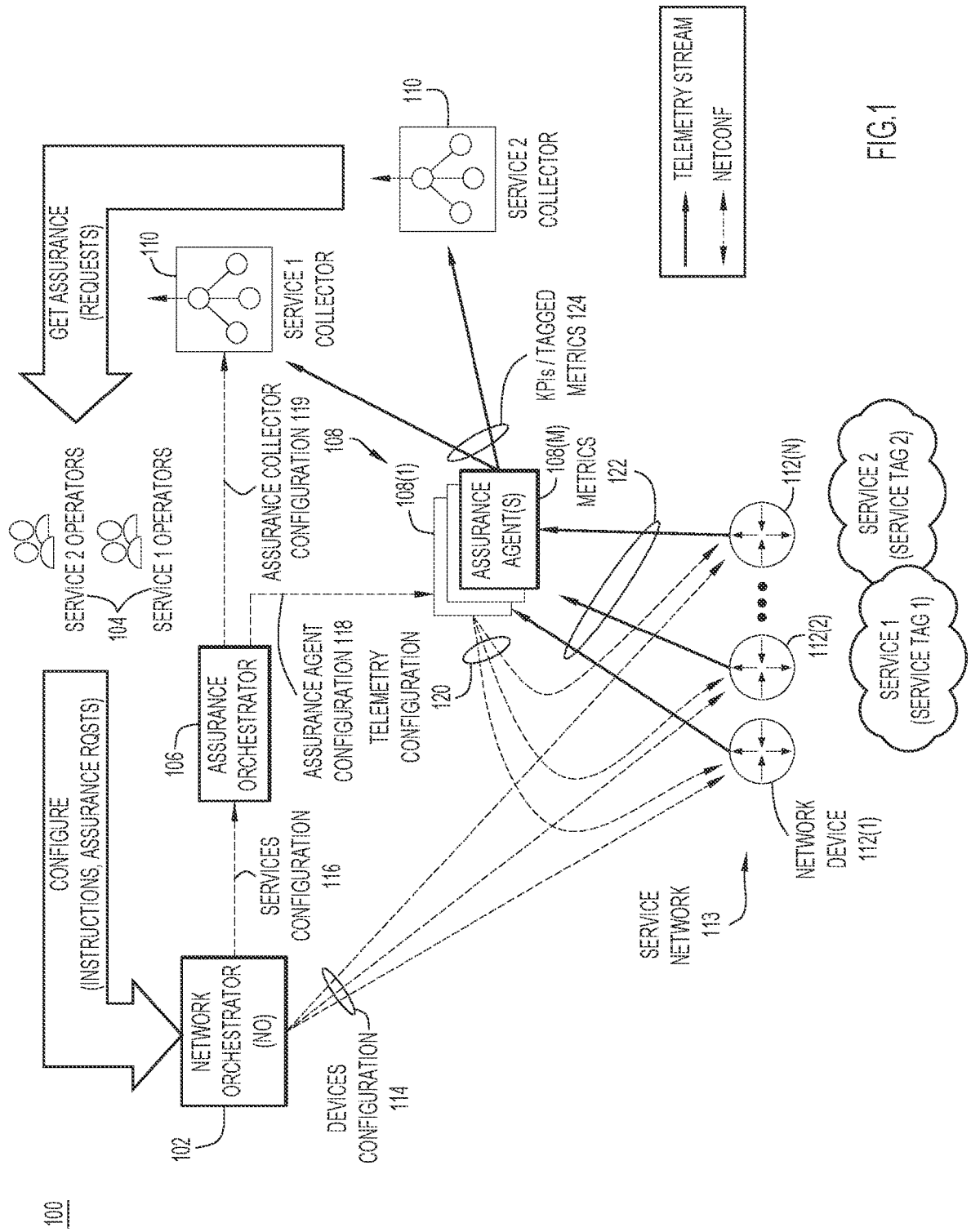
FIG. 1 is a block diagram of an assurance system configured to perform service aware conditional path monitoring, according to an example embodiment.

Referring now to FIG. 1, a diagram is shown of a service assurance system 100 according to an example embodiment. With reference to FIG. 1, there is a block diagram of an example network service assurance system or architecture (also referred to herein as a "service assurance system" 100). Service assurance system 100 may provide service assurance for and intent-based network, for example. The service assurance system 100 leverages programming capabilities of network devices in the intent-based network (also referred to as a "service network" or simply a "network"), and model/event driven telemetry from the network devices, to deliver end-to-end service assurance for various services. Assurance system 100 includes a network orchestrator (NO) 102, service operators 104 to provide instructions to the NO 102, an assurance orchestrator 106 that communicates with the NO 102, assurance agents 108(1)-108(M) (collectively, assurance agents 108) that communicate with the assurance orchestrator 106, assurance collectors 110 (also referred to as assurance collectors 110) that communicate with the assurance agents 108 and the service operators 104, and network devices 112(1)-112(N) (collectively, network devices 112) that communicate with the NO 102 and the assurance collectors 110. NO 102 configures network devices 112(1)-112(N) to implement an intent-based service network 113 enabled to provide a variety of services to end users. Network devices 112 may include routers, switches, gateways, and other network devices (physical or virtual). Assurance orchestrator 106, assurance agents 108, and assurance collectors 110 are generally referred to as one or more "assurance entities."

NO 102 may include applications and/or services hosted on one or more server devices (more simply referred to as servers), for example, in a cloud-based data center. Assurance orchestrator 106 may also include applications and/or services hosted on one or more server devices, which may be the same as or different from the servers used by NO 102. Similarly, assurance collectors 110 may also include applications and/or services hosted on one or more servers, which may be the same or different from the servers used by assurance orchestrator 106. Assurance agents 108(1)-108(N) may each include applications and/or services hosted on one or more servers, and may be distributed geographically to be near respective ones of network devices 112(1)-112(N) enabled for services to be monitored under control of the assurance agents. NO 102, assurance orchestrator 106, assurance agents 108, assurance collectors 110, and network devices 112 may communicate with each other over one or more communication networks, including one or more wide area networks (WANs), such as the Internet, and one or more local area networks (LANs).

In the example of FIG. 1, service assurance system 100 supports multiple services, including service 1 and service 2 (collectively, "the services"). To this end, service operators 104 include a service 1 operator for service 1 and a service 2 operator for service 2, and assurance collectors 110 include a service 1 collector for service 1 and a service 2 collector for service 2. Service operators 104 (e.g., service 1 operator and service 2 operator) provide to NO 102 network and service intent-based instructions to setup/configure the services (e.g., service 1 and service 2) for end users. Service operators 104 also receive requests for assurance (e.g., "get assurance" requests) for the services from assurance collectors 110 (e.g., service 1 collector and service 2 collector), and forward the requests to NO 102.

Responsive to the aforementioned instructions and the requests sent by service operators 104, NO 102 derives and sends to network devices 112 intent-based network device configuration information 114 to configure the network devices/service network 113 for the services (e.g., for service 1 and service 2). In addition, NO 102 derives and sends to assurance orchestrator 106 service configuration information 116 for providing assurance for the services (e.g., service 1 and service 2) enabled on service network 113. Service configuration information 116 includes, for each service deployed or implemented on service network 113, respectively, a definition of the service, including a service type (e.g., a type of network connectivity), a service instance (e.g., an identifier or name of the service), and network configuration information that describes how the service is actually implemented of service network 113. That is, the definition of the configuration of the service is reflective of how the service is instantiated as a collection of the subservices in service network 113.

For network device configuration information 114, NO 102 may employ, for example, the Network Configuration Protocol (NETCONF) to push intent-based network device configuration objects, such as Yet Another Next Generation (YANG) models or objects, to network devices 112. Similarly, for services configuration information 116, NO 102 may also employ, for example, NETCONF to push intent-based service configuration YANG objects to assurance orchestrator 106. YANG is a data modeling language used to define data sent over a NETCONF compliant network to configure resources. NETCONF is used to install, manipulate, and delete configurations of the resources, while YANG is used to model both configuration and state data of the resources.

In response to receiving the monitoring objects in telemetry configuration information 120, network devices 112 record the subservice metrics specified in the monitoring objects, and report the subservice metrics (labeled as "metrics" 122 in FIG. 1) back to assurance agents 108 in telemetry streams. In an example, the telemetry streams carry subservice metrics 122 in telemetry objects corresponding to the monitoring objects. In turn, assurance agents 108 tag subservice metrics 122 with service tags to indicate which of the subservice metrics are associated with/belong to which of the services, to produce service-tagged subservice metrics 124 (labeled "tagged metrics" in FIG. 1). In other words, assurance agents 108 apply the service tags to the subservice metrics for the services to which the service tags belong. In the example in which subservice metrics 122 are carried in telemetry objects, assurance agents 108 tag the telemetry objects with the service tag to produce service-tagged telemetry objects). Thus, the service tags provide service context to the subservice metrics.

In one embodiment, assurance agents 108 do not perform any specific analysis on the subservice metrics, leaving such analysis to assurance collectors 110 and/or assurance orchestrator 106. In another embodiment, assurance agents 108 perform analysis on subservice metrics 122 as instructed by the heuristic packages, to produce health states of the subservices (e.g., KPIs used as indicators of subservice health states) to which the subservice metrics pertain. Assurance agents 108 provide to assurance collectors 110 service-tagged subservice metrics 124, along with health states of the subservices when computed by the assurance agents. For example, assurance agents 108 provide flows of service-tagged subservice metrics tagged with service tag 1 to indicate service 1 to service 1 collector, and service-tagged subservice metrics tagged with service tag 2 to indicate service 2 to service 2 collector. Assurance agents 108 may also provide service-tagged subservice metrics 124 to assurance orchestrator 106.

Assurance orchestrator 106 operates as a central controller for assurance of the services deployed on service network 113. That is, assurance orchestrator 106 employs "service awareness" to control assurance for the services deployed on service network 113. In this role, assurance orchestrator 106 performs several main operations. First, assurance orchestrator 106 generates, from the service type and the service instance in the definition of each service defined in service configuration information 116, a unique service tag for the service. In an example, the service tag for a given service may be a tuple that includes the service type and the service instance from the definition of the given service. The service tag may be used to distinguish the service to which it pertains from all other services.

Second, assurance orchestrator 106 decomposes the definition of each service defined in service configuration information 116 into a respective subservice dependency graph of sub services and dependencies/interdependencies between the sub services that collectively (actually) implement the service on a network. That is, assurance orchestrator 106 dissects each service into the respective subservice dependency graph. The subservice dependency graph includes (subservice) nodes that represent the subservices and links between the nodes that represent the dependencies between the subservices. The subservice dependency graph may include the service type and the service instance (e.g., the service tag) for the service represented by the subservice dependency graph. To assist with the aforementioned decomposition, assurance orchestrator 106 may poll or query various network devices identified in the definition to discover sub services, such as packet routing protocols, implemented on the network devices and that are to be incorporated into the subservice dependency graph.

In a non-limiting embodiment, the sub service dependency graph includes a sub service dependency tree having a root node that represents the services, and nodes that represent the sub services and that have parent-child relationships (i.e., the dependencies) between the nodes/subservices that lead back to the root node. Other types of graph constructs/data structures may be used to represent the subservice dependency graph, as would be appreciated by one of ordinary skill in the art having read the present application.

Third, assurance orchestrator 106 derives from each sub service dependency graph a respective set of heuristic packages for the service described by the subservice dependency graph. The heuristic packages (i) specify/define servicerelated metrics (i.e., subservice metrics) to be monitored/recorded and reported by the sub services, and that are indicative of health statuses/states of the subservices, i.e., that are indicators of health states of the subservices, (ii) include rules to determine/compute key performance (KPIs) including the health states of the subservices (also referred to individually as a "subservice health state," and collectively as "subservice health states") based on the subservice metrics as recorded and reported, and (iii) which sensor paths (i.e., telemetry paths) are to be enabled for reporting telemetry, i.e., to report the subservice metrics recorded by the subservices from the subservices. The heuristic packages may also include or be associated with the service tag for the service to which the heuristic packages correspond. Assurance orchestrator 106 employs the heuristic packages to configure assurance agents 108 to monitor the subservices of the services, and to compute the health states of the subservices based on the monitoring, as described below.

Fourth, assurance orchestrator 106 provides to assurance agents 108 assurance agent configuration information 118 including the heuristic packages and their corresponding service tags in association with each other. Assurance orchestrator 106 may employ NETCONF to push the heuristic packages as YANG objects to assurance agents 108. Assurance orchestrator 106 may also provide the sub service dependency graphs to assurance collectors 110 in assurance collector configuration information 119.

Assurance agents 108 act as intermediary assurance devices between network devices 112, assurance collectors 110, and assurance orchestrator 106. More specifically, assurance agents 108 translate assurance agent configuration information 118, including the heuristic packages, to telemetry configuration information 120, and provide the telemetry configuration information to network devices 112, to configure the network devices 112 to record and report the sub service metrics mentioned above. For example, assurance agents 108 generate monitoring objects that define the subservice metrics to be recorded and reported by the subservices, and provide the monitoring objects to the subservices in telemetry configuration information 120, to configure the subservices to record and report the subservice metrics. Assurance agents 108 may maintain associations/bindings or mappings between the heuristic packages, the monitoring objects generated by the heuristic packages, and the services (e.g., service tags) to which the heuristic packages and the monitoring objects pertain. Assurance agents 108 may employ NETCONF (or RESTCONF), for example, to push YANG monitoring objects to network devices 112.

In response to receiving the monitoring objects in telemetry configuration information 120, network devices 112 record the subservice metrics specified in the monitoring objects, and report the subservice metrics (labeled as "metrics" 122 in FIG. 1) back to assurance agents 108 in telemetry streams. In an example, the telemetry streams carry subservice metrics 122 in telemetry objects corresponding to the monitoring objects. In turn, assurance agents 108 tag subservice metrics 122 with service tags to indicate which of the subservice metrics are associated with/belong to which of the services, to produce service-tagged subservice metrics 124 (labeled "tagged metrics" in FIG. 1). In other words, assurance agents 108 apply the service tags to the subservice metrics for the services to which the service tags belong. In the example in which subservice metrics 122 are carried in telemetry objects, assurance agents 108 tag the telemetry objects with the service tag to produce service-tagged telemetry objects). Thus, the service tags provide service context to the subservice metrics.

Figure 2:
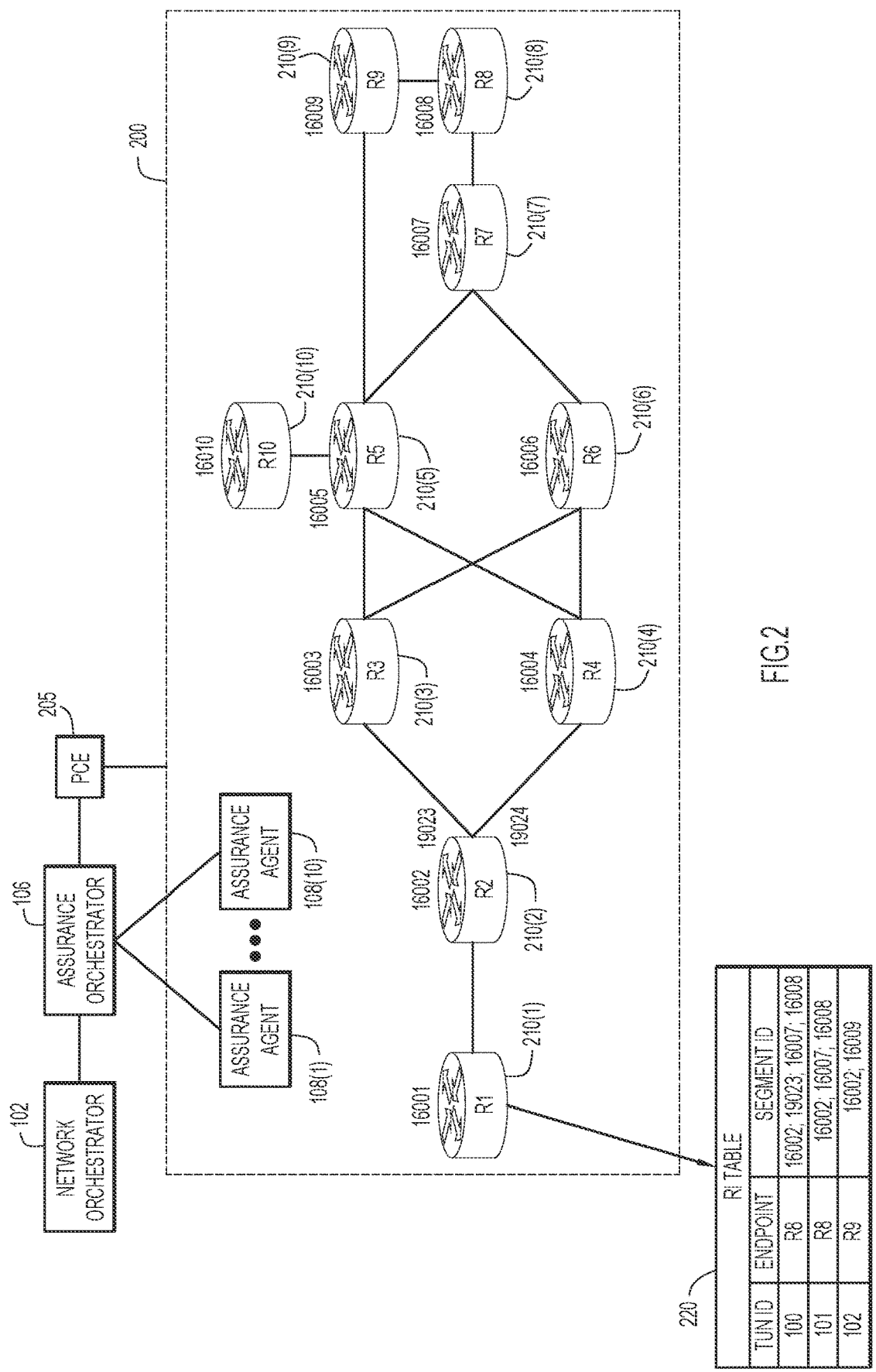
FIG. 2 is a block diagram showing the assurance system configured to perform service aware conditional path monitoring for an example network, according to an example embodiment.

In a large network, there may be numerous ECMP paths. The transit nodes may have entries of forwarding instructions in a forwarding table, but the transit nodes may be using only a selective set of forwarding instructions forwarding, which varies depending on what type of service they are using or what type of service is enabled between the endpoints. Consider an example network 200 shown in FIG. 2. The network 200 is a Segment Routing (SR) network that includes nodes (e.g., routers) R1-R7, shown at reference numerals 210(1)-210(7), respectively. A Path Computation Element (PCE) 205 or other similar network control entity configures the topology for the network 200. The Segment Identifiers (SIDs) associated with each of these nodes is shown in FIG. 2 (R1=16001, R2=16002, R3=16003, ..., R10=16010). In addition, the egress interface of R2 to which R3 is the next hop has the SID 19023, and the egress of R2 to which R4 is the next hop has the SID 19024.

In the network 200, R1, R8, R9 and R10 act as provider edge (PE) nodes. R1 shares services with R8 and R9 but nothing with R10 (no client site connected). The SLA requirement suggests that traffic from R1 to R8 and from R1 to R9 use 3 tunnels, Tunnel (Tun) IDs 100, 101 and 102. Tunnel 100 is from R1-R8, Tunnel 101 is from R1-R8, and Tunnel 102 is from R1-R9. FIG. 2 shows a routing table 220 for R1 that includes the Tunnel IDs, Endpoints and SIDs for each of the tunnels.

DPM is a feature that can be enabled on a node (test node) to monitor its own data plane/forwarding table. For whatever prefix is to be monitored, the test node generates a probe and loops it back to the previous hop (which will forward it to the test node). The test node will receive the probe, and then the test node forwards the probe to the next hop. The TTL value is set to 3 for DPM.

In the example of FIG. 2, enabling DPM on R2 can validate all the prefix-SIDs and adjacency-SIDs. It could take several seconds to test each prefix. In a large network, DPM-based prefix validation could take several minutes for a given prefix.

The forwarding lookup on R2 can be narrowed down to a selective/smaller set of forwarding information (e.g., SIDs) by decomposing the tunnels/policies on the edge nodes that will be using R2 as a transit node. In the example of FIG. 2, the policies/tunnels on R1 will require R2 to perform a forwarding lookup primarily on segments 19023, 16007, 16009. Thus, a better testing solution is one in which R2 prioritizes testing of 16007, 19023 and 16009 while other SIDs can be tested at a slow/normal pace. However, currently there is no service awareness for DPM and such prioritized-based testing is not possible. In other words, there is no capability heretofore known for selective enablement of DPM on a node.

As described above, the assurance orchestrator 106 is a centralized controller for service assurance, and has service awareness. Based on the services configured in the network 200 and configurations obtained from the network orchestrator 102, the assurance orchestrator 106 dissects the services to identify the relevant metrics to be monitored in relevant nodes for service assurance. More specifically, the capabilities of assurance orchestrator 106 and assurance agents 108(1)-108(10) (associated with respective ones of the nodes R1-R10) and DPM are leveraged to realize service awareness based DPM monitoring for fault localization.

The assurance orchestrator 106 identifies the services (such as Segment Routing-Traffic Engineering (SR-TE), Policy etc.) enabled on each headend node. For each such services, the assurance orchestrator 106 identifies the transit nodes and the forwarding instruction(s) that will be processing. The assurance orchestrator 106 creates a list of forwarding instruction information, such as transit_node{segment_ids_list}, on a per transit node basis.

The assurance orchestrator 106 uses YANG/NETCONF extensions to trigger DPM on the relevant transit node for the relevant list of forwarding instruction information. Each transit nodes will prioritize the forwarding instructions in the list at a higher rate, but will still validate the other forwarding instructions in its table at a lower rate. The assurance orchestrator 106 configures the relevant assurance agents to subscribe to DPM monitoring results for the relevant segment ID to each node, and analyzes the DMP monitoring results to isolate any failure.

Thus, using service awareness, forwarding instructions that are of a higher priority are given higher priority for DPM over other forwarding instructions. The assurance orchestrator 106 identifies the nodes which need to be prioritized and the relevant forwarding instructions, and configures those devices with the relevant forwarding instructions for monitoring. Thus, the assurance orchestrator 106 identifies the relevant nodes and the relevant forwarding instructions within the nodes for monitoring for a particular service.

Since DPM can take a non-trivial amount of time to run, the techniques presented herein are providing selectivity about which subset of nodes and forwarding instructions on nodes that are to be tested using DPM.

Still referring to FIG. 2, the assurance orchestrator 106 obtains the network configuration information from the network orchestrator 102 to identify the service that was enabled and obtains topology information from PCE 205 or other similar entity. The assurance orchestrator 106 determines all the available ECMP paths in network 200.

The assurance orchestrator 106 identifies that one of the sub-services to be monitored is end-to-end connectivity. The assurance orchestrator 106 decomposes the services on a per-headend basis as described above to produce a list of sub-services on a per headend basis, for each sub-service, the list of paths available, and the forwarding instructions used for each path.

For example, for the topology shown in FIG. 2, the assurance orchestrator 106 determines that R1 is providing L3VPN service to R9 and to R8 using Tunnels 100, 101 and 102, as shown in the table 220. A sample example of the decomposed service information is shown in FIG. 3.

FIG. 3 shows that Tunnel 100 has two paths to endpoint R8 using Segments {16002, 19023, 16007, 16008}. Tunnel 101 has four paths to endpoint R8 using Segments {16002, 16007, 16008}. Tunnel 102 has two paths to endpoint R9 using Segments {16002, 16009}.

Based on the list from each headend, the transit nodes and the active forwarding sids on each of the transit nodes are narrowed down. In the example of FIG. 2, R2 will actively forward packets with top segment ID as 19023, 16007 and 16009. An active forwarding SID is a particular SID that the transit node will need to look in to in order to take an action for a given service. Again, from the point of view of R2, these are the active segments and the priority list is 19023, 16007 and 16009.

The assurance orchestrator 106 will narrow the forwarding instructions (e.g., SID list) to be validated (Validation-SID-list) on a per node basis. In the example of FIG. 2, R2 will be a transit node for R1 and will be actively forwarding traffic based on SIDs 19023, 16007 and 16009. Based on the services instantiated, the priority list of forwarding instructions (e.g., validation-SID-list) for R2 will be {19023, 16007, 16009}. Accordingly, the assurance orchestrator 106 instructs R2 to prioritize the DPM (validation) check for the {19023, 16007, 16009} (at higher rate) compared to DPM (validation) check on the other SIDs (at lower rate) in its Routing Information Base/Forwarding Information Base (RIB/FIB) table. The same procedure is used for other transit nodes as well.

Figure 4:
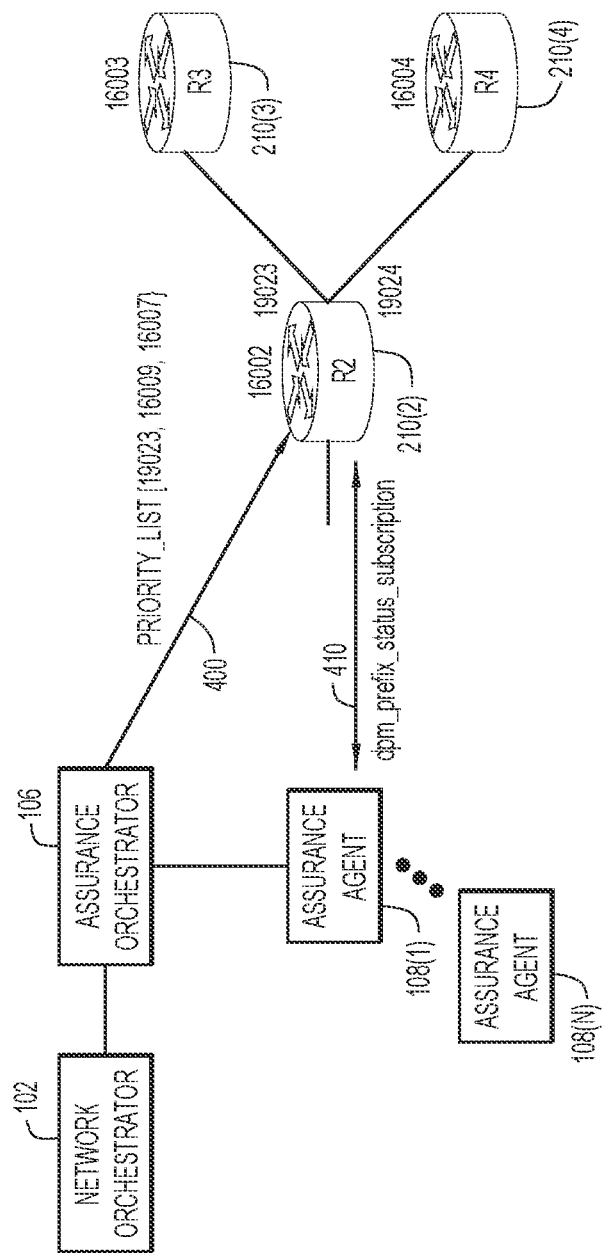
FIG. 4 is a block diagram of the assurance system configuring a priority list of forwarding information for monitoring on a node, according to an example embodiment.

Reference is now made to FIG. 4. The assurance orchestrator 106 consolidates all the priority lists on a per device/per transit node basis and instructs the relevant nodes accordingly. FIG. 4 shows that at 400, for node R2, the assurance orchestrator 106 sends the priority list {19023, 16007, 16009} to node R2 for DPM. The assurance orchestrator 106 will then enable DPM on the node (with the relevant priority list). If DPM is not already enabled on R2, the assurance orchestrator 106 will enable it on R2 and instruct R2 to validate the priority list using DPM. When DPM is already enabled on R2, the assurance orchestrator 106 will instruct the node R2 perform DPM with the priority list.

The assurance orchestrator 106 will also instruct the appropriate ones of the assurance agents 108(1)-108(N) to subscribe to the relevant DPM monitoring results, denoted dpmprefix status subscription, as shown at 410 in FIG. 4. In one implementation, on a given node that has DPM enabled, there may be one DPM process dedicated solely to the SIDs in the priority list, and another, separate DPM process, that runs on other SIDs (not on the priority list) in the table for the node.

Another way of identifying the priority list is on an end-to-end or per-service basis. For example, in the context of the example of FIG. 2, the assurance orchestrator 106 can instruct transit nodes to validate a prefix on a per tunnel basis. For example, for Tunnel 100 from R1, there are 2 paths as below:
  Path1={R1, R2, R3, R5, R7, R8}
  Path2={R1, R2, R3, R6, R7, R8}
Based on the SID and the associated node, the assurance orchestrator 106 validates
  Tunnel 100 over all paths as below:
  R1(16002), R2(19023), R3(16007), R5(16007), R6(16007), R7(16008)
The SID inside the ( ) is the active SID on that node to apply this service.

Thus, in this alternative technique, the assurance orchestrator 106 identifies the active segment ID (top most label that is received by) for each of the transit nodes. The assurance orchestrator 106 then determines the priority for different transit nodes in order to apply a particular service. The assurance orchestrator 106 identifies all the paths, and then for each of the nodes in a path, the assurance orchestrator 106 identifies the active SID. Again, this is a different way of identifying the transit nodes and the priority list.

Figure 5:
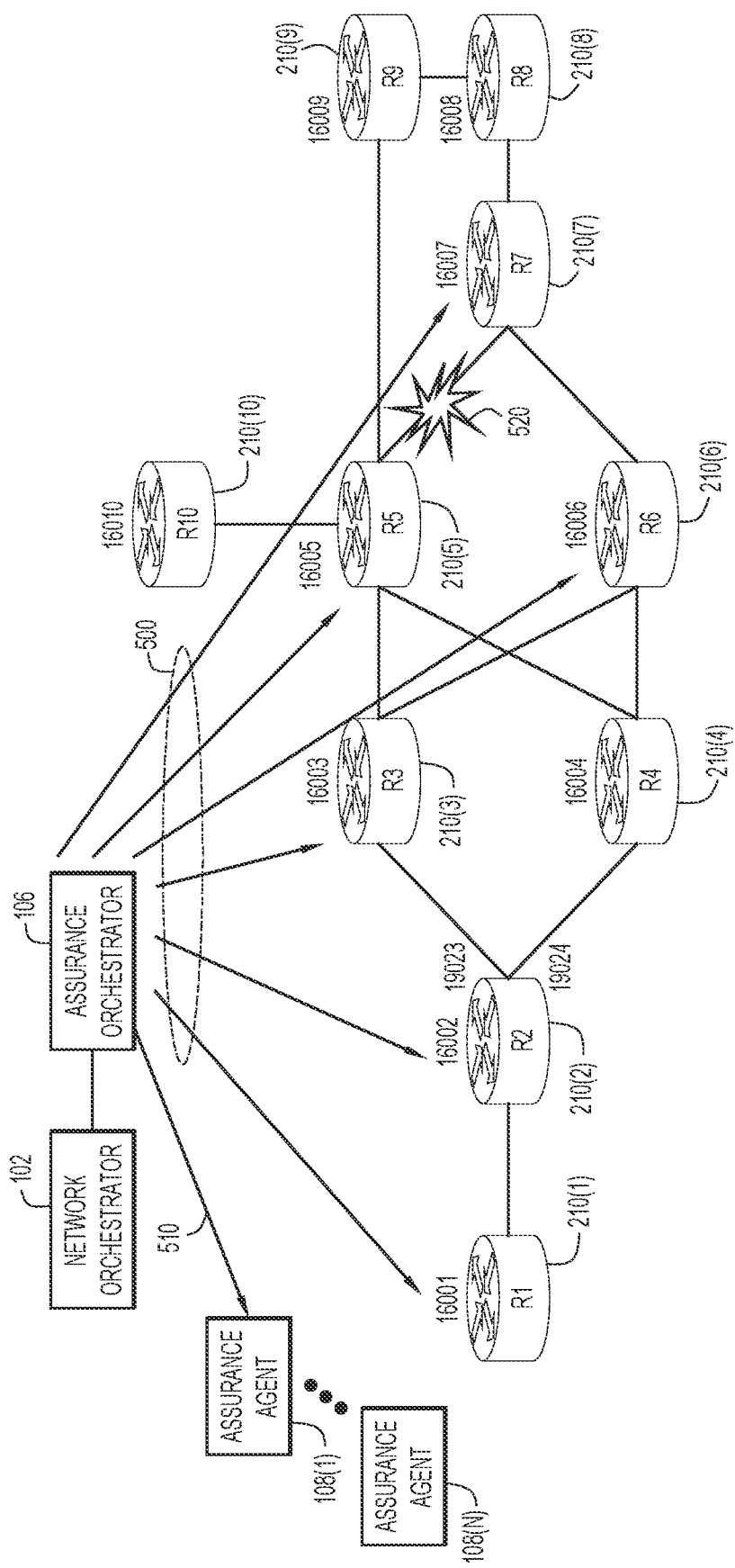
FIG. 5 is a block diagram of the assurance system configuring several nodes of a service to perform monitoring, according to an example embodiment.

Reference is now made to FIG. 5, which shows the embodiment in which the assurance orchestrator 106 instructs the relevant nodes to use DPM to monitor the relevant prefixes. The assurance orchestrator 106 also instructs the appropriate ones of the assurance agents 108(1)-108(N) to subscribe to the status of those DPM operations.

Tunnel 100 on R1 uses {16002, 19023, 16007, 16008}. This boils down to the below set of SIDs to be validated by different nodes as follows.
  R1 should validate 16002
  R2 should validate 19023
  R3 and R5 should validate 16007
  R7 should validate R8

Thus, as shown at 500, the assurance orchestrator 106 instructs node R1 to use DPM to validate 16002, instructs node R2 to use DPM to validate 19023, instructs nodes R3 and R5 to use DPM to validate 16007, and instructs R7 to use DPM to validate R8. At 510, the appropriate ones of the assurance agents 108(1)-108(N) are configured to subscribe to the DPM results.

The assurance agents may be configured to subscribe to the same monitoring results for other services as well. For example, Tunnel 100 from R1 requires R2 to validate 19023. So R2 does not need to create/validate additional SIDs. The assurance agents are instructed to subscribe to the same status update of 19023 and (re)use it for R1-Tunnel 100 service assurance.

Any failure will be detected by the assurance agents based on the DPM results to which it is subscribed. In case of a failure, the assurance agent that detected the failure will immediately notify the assurance orchestrator 106 or network orchestrator 102 for immediate action. For example, as shown at 520 in FIG. 5, R5 fails to forward to 16007 due to some problem, such as a programming corruption. The assurance agents that subscribe to the DPM results for DPM on node R5 detect the failure immediately, and notify the assurance orchestrator 106. The assurance orchestrator 106 has the details about the list of headends using this transit path and can take a corrective or remediation action.

In the examples described above in connection with FIGS. 1-5, segments, segment IDs, and labels are referred to in terms of how nodes forward traffic. The use of these terms is meant to be by way of example only. The service aware conditional path monitoring techniques are applicable more generally to the use of any type of forwarding instructions employed on nodes in a network. Thus, the term "forwarding instructions" is meant to include, without limitation, Segment Identifiers (SIDs), Multi-Protocol Label Switching (MPLS) labels, Internet Protocol (IP) addresses, port identifiers or any other type of forwarding instruction now known or hereinafter developed, Network Service Header (NSH), Virtual Extensible Local Area Network (VXLAN) header information, service function instructions such as for Network Address Translation (NAT), Quality of Service (QoS), Firewall, etc.

Figure 6:
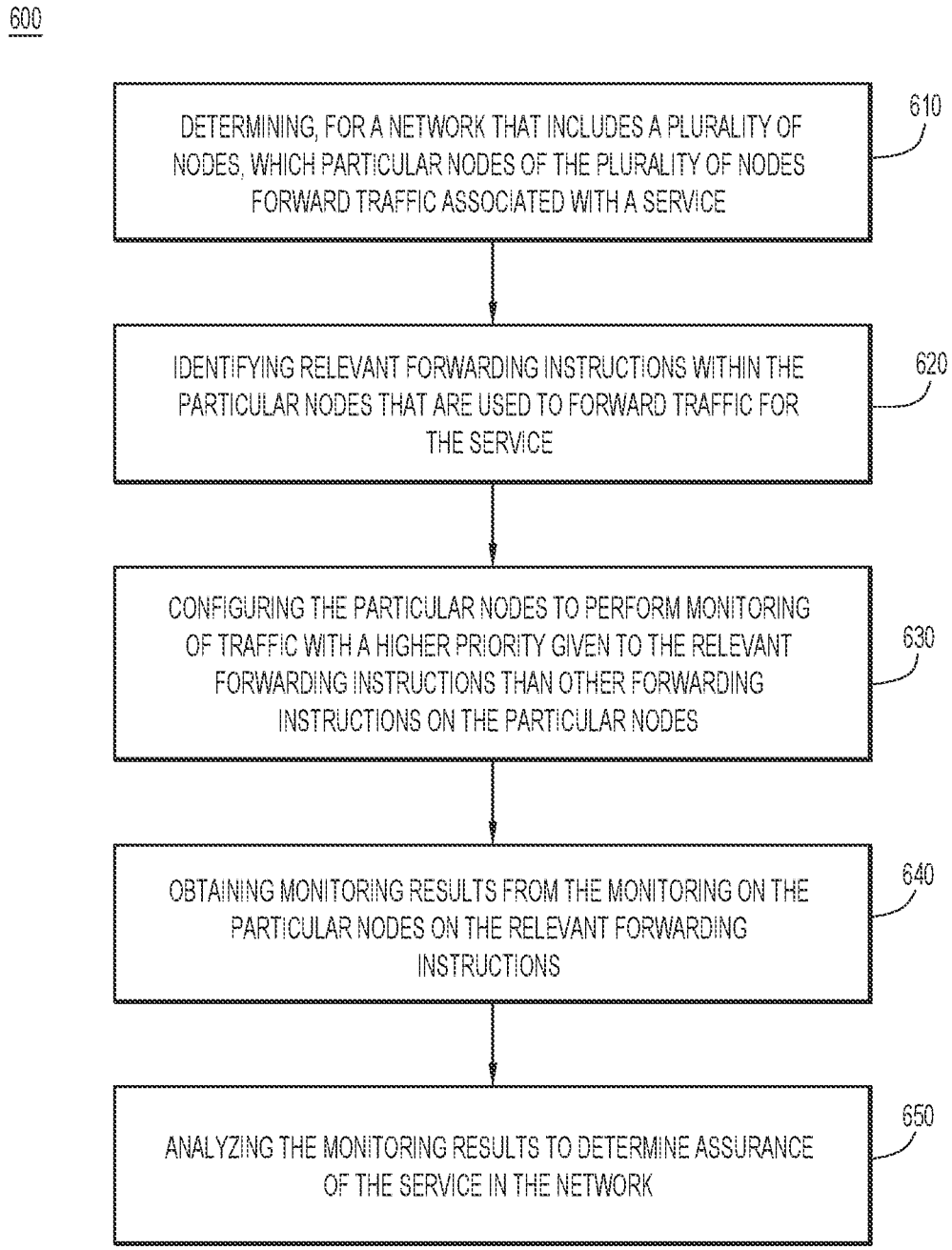
FIG. 6 is a flow chart of a method for service aware conditional path monitoring, according to an example embodiment.

Reference is now made to FIG. 6. FIG. 6 shows a flow chart for a method 600 according to an example embodiment. The method 600 may be performed, for example, by the assurance orchestrator 106 shown in FIGS. 1, 2, 4 and 5. At 610, the method 600 includes determining, for a network that includes a plurality of nodes, which particular nodes of the plurality of nodes forward traffic associated with a service. At 620, the method 600 involves identifying relevant forwarding instructions within the particular nodes that are used to forward traffic for the service. At 630, the method 600 includes configuring the particular nodes to perform monitoring of traffic with a higher priority given to the relevant forwarding instructions than other forwarding instructions on the particular nodes. At 640, the method 600 involves obtaining monitoring results from the monitoring of traffic on the particular nodes on the relevant segments or labels. Finally, at 650, the method 600 includes analyzing the monitoring results to determine assurance of the service in the network.

In one example embodiment, operation 620 of identifying relevant forwarding instructions may include determining for a given particular node of the particular nodes, which one or more forwarding instructions are active forwarding instructions for the service; and generating for the given particular node, a priority list including one or more active forwarding instructions.

In another example embodiment, operation 620 the relevant forwarding instructions is performed on a per service basis, and includes: identifying one or more relevant paths in the network used for the service; and for each of the nodes in each of the one or more relevant paths, identifying one or more active forwarding instructions.

In one example, operation 630 may include providing the priority list to the given particular node. In addition, operation 630 of configuring may include configuring the particular nodes to perform data plane monitoring.

As described above, the relevant forwarding instructions may include one or more of: addresses, segment identifiers, port identifiers, or labels.

In an example embodiment, the analyzing operation 650 may include: detecting a forwarding failure in the network; and identifying which node of the plurality of nodes is experiencing the failure.

Operation 640 of obtaining the monitoring results may include: configuring one or more assurance agent functions to subscribe to the monitoring results; and obtaining, at a centralized entity, the monitoring results from the one or more assurance agent functions.

The method 600 may further include performing a failure remediation action in the network based on which node of the plurality of nodes is experiencing the failure. Such failure remediation may include disabling a node and reconfiguring another node to take the place of, and perform the forwarding actions, of the failing node. Other failure remediation actions may include shutting down an ECMP group member, re-routing a link or a node.

Further still, the method 600 may further include decomposing the service into a plurality of sub-services. In this case, the operations 620-650 (identifying, configuring, obtaining monitoring results, and analyzing) are performed for each of the sub-services.

To summarize, service orchestration techniques are employed to identify the service on the headend node. The service may be decomposed into sub-services. The relevant/ active forwarding instructions are identified on the transit nodes involved in forwarding traffic for the service. The active forwarding instructions are formed into a priority list that is used to instruct the transit nodes(s) for performing monitoring of the forwarding behavior and making monitoring results available to one or more assurance agents. Transit nodes use the priority list to use perform monitoring at different rate at which the monitoring probes are sent such a higher rate is used for forwarding instructions on the priority list and a lower rate is used for other forwarding instructions not on the priority list. These techniques tie service visibility to data plane monitoring (with ECMP awareness) to offload monitoring on the relevant nodes (at scale) based on service priority. Nodes are instructed with a priority list for providing the monitoring results in telemetry.

Figure 7:
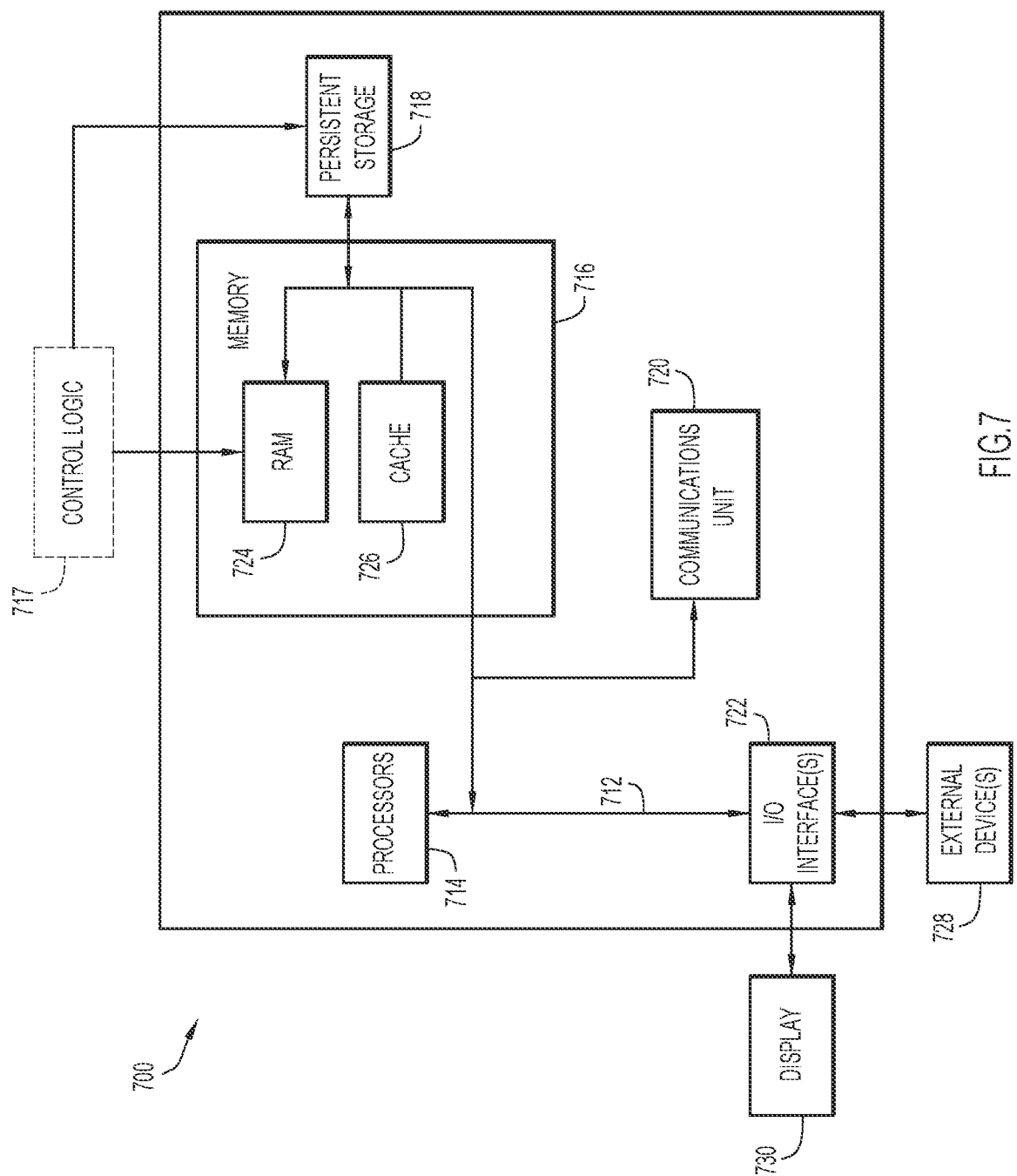
FIG. 7 is a block diagram of a computing device configured to perform the operations presented herein for service aware conditional path monitoring, according to an example embodiment.

FIG. 7 illustrates a hardware block diagram of a computing device 700 that may perform functions of the assurance orchestrator 106, described above. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the control logic 717 that controls and performs operations of the assurance orchestrator 106, may be stored in memory 716 or persistent storage 718 for execution by processor(s) 714. When the processor(s) 714 execute the control logic for the assurance orchestrator 106, the processor(s) 714 are caused to perform the assurance orchestrator 106 functions described above in connection with FIGS. 1-6.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a method is provided comprising: determining, for a network that includes a plurality of nodes, which particular nodes of the plurality of nodes forward traffic associated with a service; identifying relevant forwarding instructions within the particular nodes that are used to forward traffic for the service; configuring the particular nodes to perform monitoring of traffic with a higher priority given to the relevant forwarding instructions than other forwarding instructions on the particular nodes; obtaining monitoring results from the monitoring of traffic on the particular nodes on the relevant forwarding instructions; and analyzing the monitoring results to determine assurance of the service in the network.

In another embodiment, an apparatus is provided comprising a communication interface configured to enable communication with a plurality of nodes in a network; and a processor coupled to the communication interface, wherein the processor is configured to perform operations including: determining which particular nodes of the plurality of nodes forward traffic associated with a service; identifying relevant forwarding instructions within the particular nodes that are used to forward traffic for the service; configuring the particular nodes to perform monitoring of traffic with a higher priority given to the relevant forwarding instructions than other forwarding instructions on the particular nodes; obtaining monitoring results from the monitoring of traffic on the particular nodes on the relevant forwarding instructions; and analyzing the monitoring results to determine assurance of the service in the network.

In still another form, one or more non-transitory computer readable storage media are provided that store/encoded with instructions that, when executed by a processor, cause the processor to perform operations including: determining, for a network that includes a plurality of nodes, which particular nodes of the plurality of nodes forward traffic associated with a service; identifying relevant forwarding instructions within the particular nodes that are used to forward traffic for the service; configuring the particular nodes to perform monitoring of traffic with a higher priority given to the relevant forwarding instructions than other forwarding instructions on the particular nodes; obtaining monitoring results from the monitoring of traffic on the particular nodes on the relevant forwarding instructions; and analyzing the monitoring results to determine assurance of the service in the network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    determining, for a network that includes a plurality of nodes, which particular nodes of the plurality of nodes forward traffic associated with a service configured to fulfill a service level agreement;
    within each of the particular nodes, identifying forwarding instructions having prefixes used to forward traffic for the service along paths defined by the prefixes;
    for each of the particular nodes, narrowing down the forwarding instructions to a priority list of forwarding instructions that is to be used by each of the particular nodes to perform data plane monitoring (DPM) prefix validation;
    configuring the particular nodes to perform the DPM prefix validation with a higher priority given to the priority list of forwarding instructions than other forwarding instructions on the particular nodes;
    obtaining DPM results from the DPM prefix validation performed by the particular nodes based on the priority list of forwarding instructions; and
    analyzing the DPM results, which include forwarding failures, to determine assurance of the service in the network.

2. The method of claim 1, wherein identifying forwarding instructions includes:
    determining for a given particular node of the particular nodes, which one or more forwarding instructions are active forwarding instructions for the service; and
    generating for the given particular node, a priority list including one or more active forwarding instructions.

3. The method of claim 2, wherein configuring includes:
    providing the priority list to the given particular node.

4. The method of claim 1, wherein identifying forwarding instructions is performed on a per service basis, and includes:
    identifying one or more paths in the network used for the service; and
    for each of the nodes in each of the one or more paths, identifying one or more active forwarding instructions.

5. The method of claim 1, wherein configuring includes configuring the particular nodes to perform DPM prefix validation.

6. The method of claim 1, wherein the priority list of forwarding instructions include one or more of: addresses, segment identifiers, port identifiers, or labels.

7. The method of claim 1, wherein analyzing includes:
detecting a failure in the network; and
identifying which node of the plurality of nodes is experiencing the failure.

8. The method of claim 7, further comprising:
performing a failure remediation action in the network based on which node of the plurality of nodes is experiencing the failure.

9. The method of claim 1, wherein obtaining the DPM results includes:
configuring one or more assurance agent functions to subscribe to the DPM results; and
obtaining, at a centralized entity, the DPM results from the one or more assurance agent functions.

10. The method of claim 1, further comprising:
decomposing the service into a plurality of subservices; and
wherein identifying, configuring, obtaining DPM results, and analyzing are performed for each of the sub services.

11. An apparatus comprising:
a communication interface configured to enable communication with a plurality of nodes in a network; and
a processor coupled to the communication interface, wherein the processor is configured to perform operations including:
determining which particular nodes of the plurality of nodes forward traffic associated with a service configured to fulfill a service level agreement;
within each of the particular nodes, identifying forwarding instructions having prefixes used to forward traffic for the service along paths defined by the prefixes;
for each of the particular nodes, narrowing down the forwarding instructions to a priority list of forwarding instructions that is to be used by each of the particular nodes to perform data plane monitoring (DPM) prefix validation;
configuring the particular nodes to perform the DPM prefix validation with a higher priority given to the priority list of forwarding instructions than other forwarding instructions on the particular nodes;
obtaining DPM results from the DPM prefix validation performed by the particular nodes based on the priority list of forwarding instructions; and
analyzing the DPM results, which include forwarding failures, to determine assurance of the service in the network.

12. The apparatus of claim 11, wherein the processor is configured to perform identifying the priority list of forwarding instructions by:
determining for a given particular node of the particular nodes, which one or more forwarding instructions are active forwarding instructions for the service; and
generating for the given particular node, a priority list including one or more active forwarding instructions.

13. The apparatus of claim 12, wherein the processor is configured to perform the configuring by providing the priority list to the given particular node.

14. The apparatus of claim 11, wherein the processor is configured to perform the identifying the priority list of forwarding instructions on a per service basis, and including:
identifying one or more paths in the network used for the service; and
for each of the nodes in each of the one or more paths, identifying one or more active forwarding instructions.

15. The apparatus of claim 11, wherein the processor is configured to perform the analyzing by:
detecting a failure in the network; and
identifying which node of the plurality of nodes is experiencing the failure.

16. The apparatus of claim 15, wherein the processor is further configured for:
performing a failure remediation action in the network based on which node of the plurality of nodes is experiencing the failure.

17. One or more non-transitory computer readable storage media storing instructions that, when executed by a processor, cause the processor to perform operations including:
determining, for a network that includes a plurality of nodes, which particular nodes of the plurality of nodes forward traffic associated with a service configured to fulfill a service level agreement;
within each of the particular nodes, identifying forwarding instructions having prefixes used to forward traffic for the service along paths defined by the prefixes;
for each of the particular nodes, narrowing down the forwarding instructions to a priority list of forwarding instructions that is to be used by each of the particular nodes to perform data plane monitoring (DPM) prefix validation;
configuring the particular nodes to perform the DPM prefix validation with a higher priority given to the priority list of forwarding instructions than other forwarding instructions on the particular nodes;
obtaining DPM results from the DPM prefix validation performed by the particular nodes based on the priority list of forwarding instructions; and
analyzing the DPM results, which include forwarding failures, to determine assurance of the service in the network.

18. The one or more non-transitory computer readable storage media of claim 17, wherein the instructions operable for performing the identifying the priority list of forwarding instructions, include instructions operable for:
determining for a given particular node of the particular nodes, which one or more forwarding instructions are active forwarding instructions for the service; and
generating for the given particular node, a priority list including one or more active forwarding instructions.

19. The one or more non-transitory computer readable storage media of claim 18, wherein the instructions operable for configuring include instructions operable for providing the priority list to the given particular node.

20. The one or more non-transitory computer readable storage media of claim 17, wherein the instructions operable for performing the identifying the priority list of forwarding instructions are performed on a per service basis, and include instructions operable for:
identifying one or more paths in the network used for the service; and
for each of the nodes in each of the one or more paths, identifying one or more active forwarding instructions.

* * * * *